United States Patent [19]

Pavel et al.

[11] Patent Number: 4,932,204
[45] Date of Patent: Jun. 12, 1990

[54] EFFICIENCY COMBINED CYCLE POWER PLANT

[75] Inventors: James Pavel, Lake Mary; Gerald A. Myers, Longwood; Theodore S. Baldwin, Casselberry, all of Fla.

[73] Assignee: Westinghouse Electric Corp., Pittsburgh, Pa.

[21] Appl. No.: 332,195

[22] Filed: Apr. 3, 1989

[51] Int. Cl.$^5$ .......................... F02C 6/18; F02C 7/224
[52] U.S. Cl. ................. 60/39.02; 60/39.182; 60/736
[58] Field of Search ................. 60/39.02, 39.182, 736, 60/39.511

[56] References Cited

U.S. PATENT DOCUMENTS

| | | | |
|---|---|---|---|
| 3,895,488 | 7/1975 | Koch | 60/736 |
| 3,974,642 | 8/1976 | Pacault | 60/736 |
| 4,020,632 | 5/1977 | Coffinberry et al. | 60/736 |
| 4,207,842 | 6/1980 | Kehlhofer | 60/39.182 |
| 4,288,979 | 9/1981 | Liljedahl et al. | 60/39.182 |
| 4,505,124 | 3/1985 | Mayer | 60/730 |
| 4,569,197 | 2/1986 | Adrian et al. | 60/39.02 |
| 4,572,110 | 2/1986 | Haeflich | 60/39.182 |
| 4,582,027 | 4/1986 | Cuscino et al. | |
| 4,785,622 | 11/1988 | Plumley et al. | 60/39.182 |
| 4,829,938 | 5/1989 | Motai et al. | 60/39.182 |
| 4,854,121 | 8/1989 | Arii et al. | 60/39.182 |

FOREIGN PATENT DOCUMENTS 35108    3/1980  Japan .................................. 60/39.182
55-125325 9/1980  Japan .
60-198337 10/1985 Japan .

OTHER PUBLICATIONS

American Society of Mechanical Engineers, Publication No. 84-GT-201, Entitled "Acceptance Criteria For Heat Recovery Steam Generators Behind Gas Turbines", Pasha, Akber (1986).
American Society of Mechanical Engineers, Publication No. 84-GT-126, entitled, "Design of Gas Turbine Exhaust Heat Recovery Boiler Systems", Deltak Corporation, Minneapolis, MN (1984).

Primary Examiner—Donald E. Stout
Attorney, Agent, or Firm—K. Bach

[57] ABSTRACT

The efficiency of a combined cycle power plant is improved by preheating fuel supplied to a combustion turbine. The flow rate of feed water through an economizer section of a heat recovery steam generator is increased, and the excess flow, over that required to sustain saturated steam production in an evaporator section, is flowed through a heat exchanger to preheat the fuel.

14 Claims, 1 Drawing Sheet

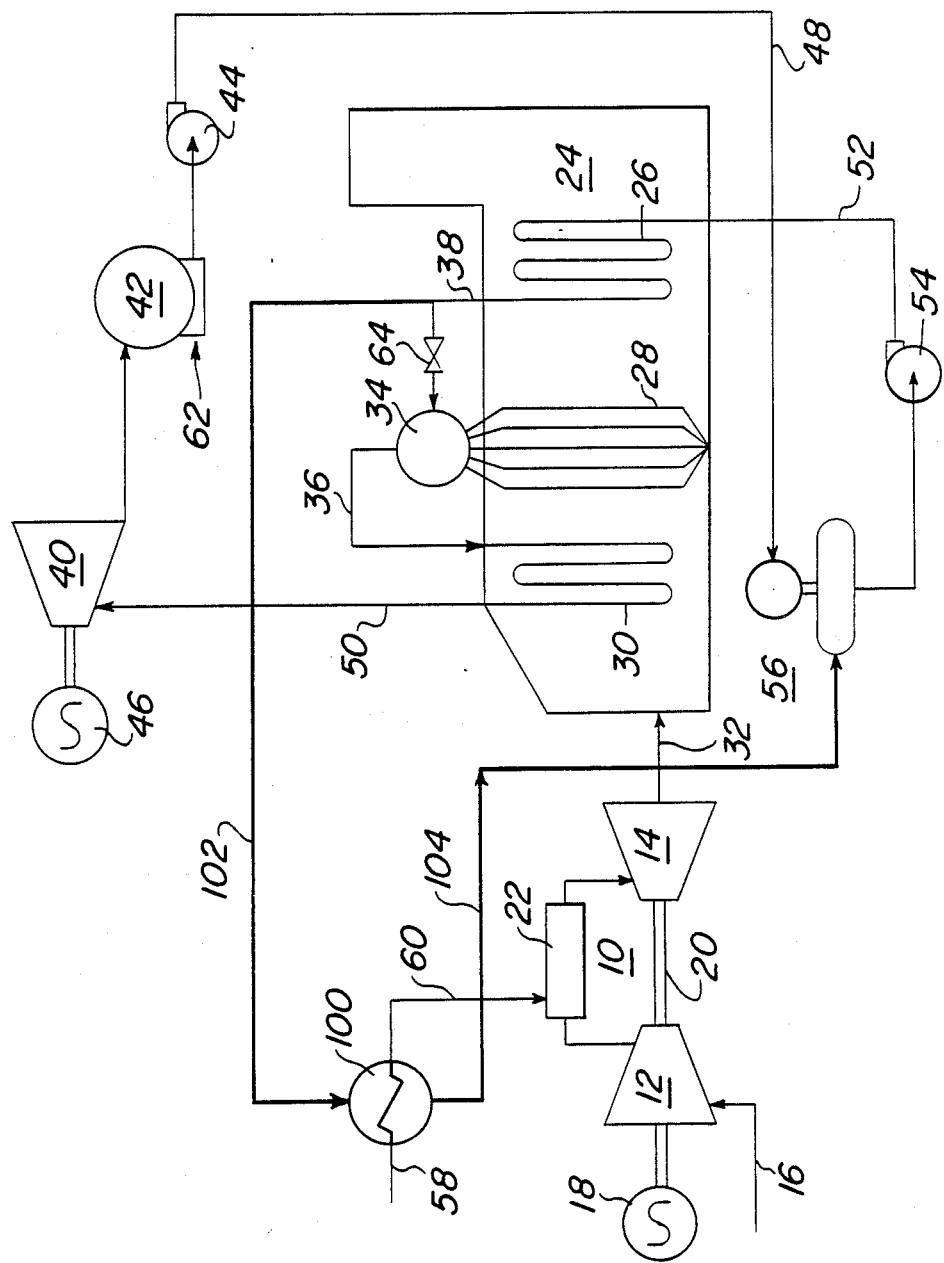

EFFICIENCY COMBINED CYCLE POWER PLANT

BACKGROUND OF THE INVENTION

1. Field of the Invention

The present invention relates generally to combined cycle power plants. More particularly, the present invention relates to a method and apparatus for improving the efficiency of a combined cycle power plant by preheating fuel supplied to a combustion turbine of the power plant.

2. Description of the Prior Art

Combined cycle power plants are well known. Typically, a combined cycle power plant comprises a combustion turbine driving an electrical generator, a heat recovery steam generator (hereinafter "HRSG") receiving exhaust gas from the combustion turbine, and a steam turbine driven by the superheated steam that drives another electrical generator. Also, typically, the HRSG comprises three heat exchanger sections, a superheater section, an evaporator section and an economizer section. The exhaust gas from the combustion turbine flows first over the superheater section, then over the evaporator section, and finally over the economizer section. Condensed water from the steam turbine is supplied as feed water to an inlet of the economizer section. The feed water is heated by the exhaust gas and heated feed water is supplied to the evaporator section which produces saturated steam. The saturated steam is thereafter provided to the superheater section which produces superheated steam, which is provided to the steam turbine. Thus, the steam turbine is interposed in a closed loop connecting the inlet and outlet of the HRSG, i.e., the inlet of the economizer section and the outlet of the superheater section.

The heat recovered from the exhaust gas in the HRSG is limited by the temperature difference between the exhaust gas and the steam evaporation temperature (i.e., the evaporator "pinch" temperature). Although the economizer section helps to improve plant efficiency, the additional heat which can be recovered by the economizer section is limited by the water flow rate necessary to match the steam production in the evaporator section.

The present invention takes advantage of the inventors' recognition that the prevailing exhaust gas temperature allows additional heat recovery to improve plant efficiency.

SUMMARY OF THE INVENTION

Briefly, the present invention recovers additional heat available in the prevailing exhaust gas by increasing the water flow through the economizer section to a rate in excess of that required to match the steam production rate in the evaporator section. The excess water flow is withdrawn from the HRSG at a temperature approaching the evaporator temperature (i.e., the economizer "approach" temperature) and used to preheat fuel delivered to the combustion turbine. Plant efficiency is improved by 0.5% to 1% since preheating the fuel reduces the combustion turbine's fuel consumption.

According to the invention, a method of operating a combined cycle power plant comprises the steps of flowing exhaust gas from the combustion turbine through the HRSG and flowing feed water through the economizer section to provide heated feed water. Heated feed water is flowed through the evaporator section to produce saturated steam, but the flow rate of the feed water through the economizer section is greater than is required to match the production rate of steam in the evaporator section. The excess heated feed water from the economizer section is flowed through a heat exchanger to preheat fuel supplied to the combustion turbine. The size of the economizer section is such that increasing the flow rate of feed water therethrough does not substantially reduce the temperature of heated feed water that would otherwise be supplied by the economizer section. For a 25% increase in flow rate through the economizer section, approximately a 20% increase in the heat transfer surface area of the economizer section, (over that required without implementation of the invention) has been found to maintain the steam production rate at the same value as experienced prior to the increase in flow rate while heating the fuel to 300°. This amount of preheating increases plant efficiency 0.5% to 1%.

BRIEF DESCRIPTION OF THE DRAWING

The invention may be better understood, and further advantages and uses thereof are readily apparent, when considered in view of the following detailed description of the exemplary embodiment, taken with the accompanying drawing in which:

FIG. 1 is a diagrammatical illustration of a combined cycle power plant according to a preferred embodiment of the present invention.

DESCRIPTION OF THE PREFERRED EMBODIMENT

Referring now to the drawings, wherein like numerals represent like elements, there is illustrated in FIG. 1 a combined cycle power plant comprising a combustion turbine 10, a heat recovery steam generator ("HRSG") 24 and a steam turbine 40. As shown, the combustion turbine 10 comprises a compressor section 12 having an air inlet 16 and operatively coupled to drive an electrical generator 18. The compressor section 12 is coupled to a turbine section 14 by means of a rotor 20. A combustion section 22 heats compressed gas from the compressor section 12 and supplies it to the turbine section 14 in well known fashion. Fuel is supplied to an inlet of the combustion section 22 as shown at 60.

The HRSG 24 receives hot exhaust gas from the combustion turbine 10 as shown at 32. The HRSG comprises three heat exchanger sections, a superheater section 30, an evaporator section 28 and an economizer section 26 each having an inlet and an outlet. As is well known, the exhaust gas flows first over the superheater section 30, then over the evaporator section 28, and finally over the economizer section 26. Additional heat exchanger sections may be provided and the invention is not limited in scope to the use of an HRSG having only three sections. A closed loop around the HRSG 24 is defined by piping sections connecting the outlet of the superheater section 30, steam turbine 40, condensor 42, condensate pump 44, feed water line 48, deaerator 56, boiler feed pump 54 and the inlet to the economizer section, as shown. As is well known, feed water 52 is flowed through the economizer section 26 to provide heated, pressurized feed water at its outlet. The heated, pressurized feed water 38 is provided to a steam drum 34 operatively coupled to the evaporator section 28 to produce saturated steam in well known fashion. A valve 64 is adjusted to maintain the correct ratio of steam to water in the drum 34. Saturated steam 36 is provided to the superheater section 30. Superheated steam 50 is thereafter directed through the steam turbine 40 which drives electrical generator 46. Makeup water is added, if needed, as shown at 62.

The system thus far described is well known in the art. Normally, in the prior art, the size (i.e., surface area exposed to exhaust gas) of the economizer section 26 and the flow rate of the feed water 52 are selected so as to match the desired rate of saturated steam production in the evaporator section 28. However, according to the invention, the size (i.e., surface area exposed to the exhaust gas) of the economizer section 26 and the flow rate of feed water therethrough are both increased so that (1) the rate of flow of feed water through the economizer section 26 exceeds that required to match the rate of steam production in the evaporator section 28 and (2) the temperature of the pressurized, heated feed water 38 is not substantially reduced below that which would otherwise be provided by the economizer section 26. It has been found that, for a 25% increase in flow rate through the economizer section, approximately a 20% in the heat transfer surface area of the economizer section, or about a 5% increase in the overall surface area of the HRSG, (over that normally required without the invention) is required to maintain the steam production rate in the evaporator section at the same value as experienced prior to the increase in flow rate while heating the fuel to 300° F. The amount of preheating increases plant efficiency 0.5% to 1%.

The additional hardware required by the practice of the present invention has been labeled 100, 102, and 104. As shown, a piping section 102 connects the junction of the outlet of the economizer section 26 and drum 34 to the inlet of a heat exchanger 100. A piping section 104 connects the outlet of the heat exchanger 100 to a loop that is connected to the inlet of the economizer section 26. Fuel is flowed to an inlet of the heat exchanger, as shown at 58, then to the fuel inlet of combustion section 22, as shown at 60. The excess amount of heated, pressurized feed water 38 resulting from the increased flow rate of feed water through the economizer section 26 is diverted from the inlet of the steam drum 34, and hence from the evaporator section 28, flowed through the heat exchanger 100 and thereafter returned to the inlet of the economizer section 26. As shown, the heated feed water 104 from the heat exchanger 100 is flowed to dearator 56 before it is flowed to the inlet of the economizer section 26. Condensed steam from the steam turbine is also flowed to the dearator 56, then to the economizer inlet. The excess heated, pressurized feed water 38 is diverted at a temperature approaching the evaporator temperature, i.e., the economizer "approach" temperature. Fuel 58 for the combustion turbine 10 is preheated by virtue of the heat exchanger 100.

Since heating of the fuel 58 is accomplished using heated water obtained from a heat source located after the evaporator section (relative to the direction of flow of the exhaust gas), and further, since the temperature of the heated feed water 38 delivered to the evaporator section 28 is not substantially reduced, the recovery of the heat utilized to preheat the fuel 58 does not reduce the quantity of superheated steam otherwise available for use in the steam turbine 40. The fuel 58 is thus heated with energy which would otherwise by lost or unavailable for use. It has been found that implementation of the invention increases the system's overall efficiency by 0.5% to 1%.

Sizing of the economizer section 26 and selection of the flow rate of the feed water therethrough may be chosen using well known design equations, tables, etc. A conventional shell and tube heat exchange may be used for the heat exchanger 100. The cooled water discharged from the heat exchanger 100 may be either immediately returned to the inlet of the economizer section 26 or first used for other heating purposes. In the illustrated embodiment, the cooled water from the heat exchanger 100 is used for deaeration and is mixed with the condensed water from the steam turbine 40.

The present invention may be embodied in other specific forms without departing from the spirit or essential attributes thereof. Accordingly, reference should be made to the appended claims, rather than to the foregoing specification, as indicating the scope of the invention.

We claim as our invention:

1. Method of operating a combined cycle power plant comprising the steps of:
 (a) flowing exhaust gas from a combustion turbine through a heat recovery steam generator (HRSG);
 (b) flowing feed water through an economizer section of the HRSG at a flow rate and providing heated feed water;
 (c) flowing a first portion of the heated feed water through an evaporator section of the HRSG and producing saturated steam at a production rate, the flow rate of the feed water through the economizer section being greater than required to sustain the production rate of steam in the evaporator section;
 (d) flowing fuel for the turbine through a heat exchanger; and,
 (e) flowing a second portion of the heated feed water provided by the economizer section through the heat exchanger then to an inlet of the economizer section, thereby heating the fuel flowing through the heat exchanger.

2. Method according to claim 1 wherein the heated feed water achieves a temperature approaching the temperature of the saturated steam, defining an evaporator approach temperature, and the second portion of the heated feed water is diverted from the evaporator section at the evaporator approach temperature and flowed through the heat exchanger.

3. Method according to claim 1 wherein the economizer section has a greater surface area exposed to the exhaust gas than is required to provide heated feed water of the same temperature when the flow rate matches the production rate, the temperature of the heated feed water not being substantially reduced by flowing feed water through the economizer at a rate greater than required to sustain the production rate.

4. Method according to claim 3 further comprising the steps of flowing saturated steam through a superheater section of the HRSG, producing superheated steam and flowing the superheated steam through a steam turbine, the step of heating the fuel not substantially reducing the amount of superheated steam otherwise available for flowing through the steam turbine.

5. Method according to claim 1 wherein the heat exchanger is a conventional shell and tube heat exchanger.

6. Method according to claim 1 further comprising the step of flowing the heated feed water to a deaerator before flowing to the inlet of the economizer section.

7. Method according to claim 4 further comprising the step of condensing steam discharged by the steam turbine to recover water and flowing the recovered water and the heated feed water from the heat exchanger to a deaerator before flowing to the inlet of the economizer section.

8. In a combined cycle power plant of the type comprising a combustion turbine having a fuel inlet, and a heat recovery steam generator (HRSG) with a gas inlet for receiving exhaust gas from the turbine, the HRSG having at least economizer and evaporator sections having surface areas exposed to the exhaust gas, the economizer section having an inlet for flowing feed water therethrough at a flow rate and an outlet for supplying heated feed water, the evaporator section having an inlet for flowing heated feed water from the economizer section therethrough to produce saturated steam at a production rate and an outlet for supplying saturated steam, a method of increasing plant efficiency comprising the steps of:
   (a) flowing fuel through a heat exchanger to the fuel inlet of the turbine;
   (b) flowing feed water through the economizer section at a rate greater than required to match the production rate of steam in the evaporator section;
   (c) flowing a portion of the heated feed water from the outlet of the economizer section through the heat exchanger and heating the fuel flowing therethrough; and,
   (d) returning the portion of the heated feed water flowed through the heat exchanger to the inlet of the economizer section.

9. Method according to claim 8 wherein there is an excess amount of heated feed water as a result of the flow rate of feed water exceeding the production rate of saturated steam, the excess being diverted from the evaporator section and flowed through the heat exchanger.

10. Method according to claim 9 wherein the heated feed water achieves a temperature approaching the temperature of the saturated steam, defining an evaporator approach temperature, and the heated feed water is diverted from the inlet of the evaporator section at the evaporator approach temperature.

11. Method according to claim 9 wherein the economizer section has a greater surface area exposed to the exhaust gas than is required to provide heated feed water of the same temperature when the flow rate matches the production rate, the temperature of the heated feed water not being substantially reduced by flowing feed water through the economizer at a rate greater than required to sustain the production rate.

12. Method according to claim 8 further comprising the steps of flowing saturated steam through a superheater section of the HRSG, producing superheated steam and flowing the superheated steam through a steam turbine, the step of heating the fuel not substantially reducing the amount of superheated steam otherwise available for flowing through the steam turbine.

13. In a combined cycle power plant, method comprising the steps of:
   (a) flowing exhaust gas from a combustion turbine through a heat recovery steam generator (HRSG);
   (b) flowing feed water through an economizer section of the HRSG at a flow rate and providing heated feed water;
   (c) flowing heated feed water from the economizer section through an evaporator section of the HRSG and producing saturated steam at a production rate, the flow rate of feed water through the economizer section being of an amount greater than required to sustain the production rate of steam in the evaporator section, the economizer section having a surface area exposed to the exhaust gas greater than is required to provide heated feed water of the same temperature when the flow rate matches the production rate;
   (d) flowing saturated steam from the evaporator section through a superheater section of the HRSG and producing superheated steam;
   (e) flowing superheated steam from the superheater section through a steam turbine, condensing steam discharged by the steam turbine to recover water, and flowing the recovered water to an inlet of the economizer section;
   (f) flowing fuel for the combustion turbine through a heat exchanger then to a fuel inlet of the combustion turbine; and,
   (g) flowing a portion of the heated feed water provided by the economizer section through the heat exchanger then to the inlet of the economizer section, thereby heating the fuel;
   there being an excess amount of heated feed water as a result of the flow rate of feed water exceeding the production rate of saturated steam, the excess being diverted from the evaporator section and flowed through the heat exchanger, the heated feed water achieving a temperature approaching the temperature of the saturated steam, defining an evaporator approach temperature, the excess of the heated feed water diverted to the heat exchanger being at substantially the evaporator approach temperature, the step of heating the fuel not substantially reducing the amount of superheated steam otherwise available for flowing through the steam turbine.

14. In a combined cycle power plant of the type comprising a combustion turbine having a fuel inlet, and a heat recovery steam generator (HRSG) with a gas inlet for receiving exhaust gas from the turbine, the HRSG having at least economizer and evaporator sections for exposure to the exhaust gas, the economizer section having an inlet for receiving feed water and an outlet for supplying heated water, the evaporator section having an inlet for receiving the heated water from the economizer section and an outlet for supplying saturated steam, the improvement comprising:
   (a) a heat exchanger having an inlet for receiving fuel from a source and an outlet for supplying heated fuel to the fuel inlet of the turbine; and,
   (b) a piping section for flowing a portion of the heated water from the outlet of the economizer section through the heat exchanger and to the inlet of the economizer section.

* * * * *